(12) United States Patent
Bradley et al.

(10) Patent No.: US 9,069,143 B2
(45) Date of Patent: Jun. 30, 2015

(54) MULTIFIBER CONNECTORS FOR MULTICORE OPTICAL FIBER CABLES

(75) Inventors: Kelvin B. Bradley, Lawrenceville, GA (US); Jinkee Kim, Norcross, GA (US); Gregory A. Sandels, Buford, GA (US)

(73) Assignee: OFS FITEL, LLC, Norcross, GA (US)

( * ) Notice: Subject to any disclaimer, the term of this patent is extended or adjusted under 35 U.S.C. 154(b) by 447 days.

(21) Appl. No.: 13/049,794

(22) Filed: Mar. 16, 2011

(65) Prior Publication Data

US 2011/0229086 A1 Sep. 22, 2011

Related U.S. Application Data

(60) Provisional application No. 61/314,165, filed on Mar. 16, 2010.

(51) Int. Cl.
*G02B 6/38* (2006.01)
*G02B 6/02* (2006.01)
*G02B 6/44* (2006.01)

(52) U.S. Cl.
CPC ......... *G02B 6/3885* (2013.01); *Y10T 29/49895* (2015.01); *Y10T 29/49174* (2015.01); *G02B 6/3851* (2013.01); *G02B 6/3893* (2013.01); *G02B 6/4403* (2013.01); *G02B 6/02042* (2013.01)

(58) Field of Classification Search
None
See application file for complete search history.

(56) References Cited

U.S. PATENT DOCUMENTS

| | | | | | |
|---|---|---|---|---|---|
| 4,653,852 | A | * | 3/1987 | Suzuki et al. | 385/126 |
| 4,708,433 | A | * | 11/1987 | Kakii et al. | 385/54 |
| 5,353,365 | A | * | 10/1994 | Dumas et al. | 385/102 |
| 5,372,625 | A | * | 12/1994 | Brehm et al. | 65/409 |
| 5,594,823 | A | * | 1/1997 | Tardy et al. | 385/46 |
| 5,664,039 | A | | 9/1997 | Grinderslev et al. | |
| 5,706,380 | A | | 1/1998 | Le Noane et al. | |
| 6,078,708 | A | * | 6/2000 | de la Tocnay et al. | 385/33 |
| 6,154,594 | A | * | 11/2000 | Fiacco et al. | 385/126 |
| 6,350,062 | B2 | | 2/2002 | Knecht et al. | |
| 6,371,658 | B2 | * | 4/2002 | Chong | 385/59 |
| 7,107,795 | B2 | * | 9/2006 | Cheo | 65/390 |
| 7,295,473 | B2 | | 11/2007 | Fong et al. | |
| 8,457,462 | B2 | | 6/2013 | Imamura | |
| 2002/0197037 | A1 | | 12/2002 | Bailey et al. | |
| 2003/0190130 | A1 | * | 10/2003 | Welker et al. | 385/126 |
| 2007/0297712 | A1 | * | 12/2007 | Meneghini et al. | 385/13 |
| 2010/0195965 | A1 | * | 8/2010 | Sasaoka | 385/126 |
| 2012/0321253 | A1 | * | 12/2012 | Shimakawa et al. | 385/71 |
| 2013/0074551 | A1 | * | 3/2013 | Sasaoka | 65/386 |
| 2013/0322835 | A1 | * | 12/2013 | Butler et al. | 385/114 |

FOREIGN PATENT DOCUMENTS

| | | |
|---|---|---|
| JP | S5612603 A | 2/1981 |
| JP | S593026 A | 1/1984 |
| JP | S6126005 A | 2/1986 |

(Continued)

*Primary Examiner* — Mike Stahl
(74) *Attorney, Agent, or Firm* — Jacobs & Kim LLP

(57) ABSTRACT

Structures and techniques are described relating to the alignment of multicore fibers within a multifiber connector. These structures and techniques include: multicore fibers having a number of different shapes, including, for example, circular, elliptical, D-shaped, double D-shaped, and polygonal; multifiber ferrules, having a plurality of fiber guide holes therein of various shapes; alignment fixtures for aligning multicore fibers within multifiber ferrules; and various multicore fiber alignment techniques.

4 Claims, 16 Drawing Sheets

(56) References Cited

FOREIGN PATENT DOCUMENTS

| | | | |
|---|---|---|---|
| JP | S6227037 U | 2/1987 | |
| JP | S63128502 A | 6/1988 | |
| JP | 7-168049 A * | 7/1995 | |
| JP | 7-168050 A * | 7/1995 | |
| JP | H09203815 A | 8/1997 | |
| JP | H10104443 A | 4/1998 | |
| JP | 2004317926 A | 11/2004 | |
| JP | 2005292176 A | 10/2005 | |
| JP | 2006189615 A | 7/2006 | |
| JP | 2010152163 A | 7/2010 | |
| JP | 2010286548 A | 12/2010 | |
| WO | WO2010073822 A1 | 7/2010 | |

* cited by examiner

10

10

FIG. 2A  FIG. 2B

MULTIFIBER CONNECTORS FOR MULTICORE OPTICAL FIBER CABLES

CROSS REFERENCE TO RELATED APPLICATIONS

The present application claims the priority benefit of the following United States provisional patent applications, which are owned by the assignee of the present application, and which are incorporated herein by reference in their entirety:

U.S. Prov. Pat. App. Ser. No. 61/314,165, filed on Mar. 16, 2010.

BACKGROUND OF THE INVENTION

1. Field of the Invention

The present invention relates generally to the field of fiber optics, and in particular to improved multifiber connectors for multicore optical fiber cables.

2. Background Art

The ever increasing demand for high-density, high-speed parallel optical data links, for super-computer and data-center applications, has spawned significant interest in passive optical devices designed to facilitate reliable, cost-effective deployment. In multi-channel parallel links for super computers and data centers, thousands of optical links, operating at 1 Gb/s to 10 Gb/s, may be utilized.

In conventional configurations, one-dimensional parallel optical links typically utilize a 1×12 multimode linear array of fibers, with each fiber serving as a separate channel. In this arrangement, the fibers, which are typically on a 250-µm pitch within a ribbon, are terminated into a molded multifiber ferrule, such as an MT ferrule. The MT-terminated fibers are then used to make connections between multi-channel VSCEL and PiN photodetector arrays. For applications requiring a more rugged assembly, jacketed fibers, typically in a ribbon configuration, are terminated within MT ferrules that are then placed inside MT-RJ, MPO, MTP™, or MPX Connector Housings, to produce robust patch cords.

MT ferrules are available in numerous sizes with various hole counts, to address a wide range of connector and signal routing applications. For example, the mini MT2 and mini MT4 are used in MT-RJ patch cords. The MT4, MT8, and MT12 are used in one-dimensional array MPO and MPX patch cords.

For even higher densities, manufacturers terminate fibers into 2D-array MT16, MT24, MT48, MT60, or MT72 ferrules. However, high-density configurations assembled using standard single-core fibers have proven to be extremely expensive to produce, since achieving physical contact between all of the fibers, when two connectors are mated, requires very precise control of the polishing process to ensure coplanarity (especially in the 72-fiber variant). Also, the molded MT ferrules are very expensive to produce. The production yields on 2D-array MT ferrules leads to significantly higher cost, as one hole out of position causes a ferrule to be rejected. For instance, if a 72-fiber ferrule has one hole that doesn't meet positional requirements, then the ferrule is discarded even though there are 71 correctly positioned holes.

In addition, stacking fiber ribbons to produce the ribbon cordages, needed for the 2D configurations, leads to a relatively large, bulky, and expensive package. Also, the flexibility of the ribbon cordage is adversely affected.

SUMMARY OF THE INVENTION

Aspects of the invention are directed to structures and techniques relating to the alignment of multicore fibers within a multifiber connector. These structures and techniques include: multicore fibers having a number of different shapes, including, for example, circular, elliptical, D-shaped, double D-shaped, and polygonal; multifiber ferrules, having a plurality of fiber guide holes therein of various shapes; alignment fixtures for aligning multicore fibers within multifiber ferrules; and various multicore fiber alignment techniques.

One aspect of the invention provides a multicore fiber, comprising a plurality of cores extending longitudinally within a fiber body. The fiber body includes at least one flat side surface. The plurality of cores has a cross-sectional geometrical configuration relative to the flat side surface, such that the at least one flat side surface identifies a particular rotational orientation of the plurality of cores, and such that precise alignment of the at least one flat side surface results in a precise rotational alignment of the plurality of cores.

A further aspect of the invention provides an alignment fixture. The fixture has a chassis shaped to receive a multifiber ferrule having a body with an endface from which there extends a plurality of multicore fibers each having a flat side surface identifying a particular rotational orientation of each multicore fiber within a respective guide hole in the ferrule body. The chassis includes a base having a cutout that is shaped to closely receive the ferrule body and position it such that the flat side surfaces of the multicore fibers abut an alignment surface within the fixture. The alignment fixture further comprises fiber alignment means for urging the flat side surfaces of the multicore fibers against the fiber alignment surface against the fiber alignment surface, so as to cause each of the multicore fibers to be rotationally aligned within its respective guide hole.

A further aspect of the invention provides a multifiber ferrule, comprising a ferrule body having a plurality of guide holes therein for guiding a respective plurality of multicore fibers at an end of a multifiber optical fiber cable. The multicore fibers each have at least one flat side surface identifying a particular rotational orientation of the plurality of cores. The ferrule guide holes each have a shape including a flat side surface corresponding to the at least one flat side surface of the multicore fibers, such that alignment of the at least one flat side surface of each multicore fiber against the corresponding flat surface within its respective guide hole results in a rotational alignment of the plurality of cores.

Another aspect of the invention is directed to a method for aligning multicore fibers within a multifiber ferrule. An end portion of a multicore fiber cable containing a plurality of multicore fibers is stripped, so as to expose the bare multicore fibers. The exposed multicore fibers are inserted into a plurality of guide holes defined longitudinally through a ferrule subassembly. The cores of the fibers are aligned rotationally, in a predetermined orientation, relative to the ferrule. The multicore fiber is bonded within the ferrule. The fiber is trimmed at a ferrule endface so as to create a plurality of multicore fiber endfaces protruding from the ferrule endface. The multicore fiber endfaces are then polished.

A further aspect of the invention is directed to a method for aligning multicore fibers within a multifiber ferrule. An end portion of a multicore fiber cable containing a plurality of multicore fibers is stripped, so as to expose the bare optical fibers. The exposed multicore fibers are inserted into a plurality of guide holes defined longitudinally through a ferrule subassembly. The multicore fibers are bonded within the ferrule. The multicore fibers are trimmed a ferrule endface, so as to create a plurality of multicore fiber endfaces protruding from the ferrule end face. The multicore fiber endfaces are then polished.

BRIEF DESCRIPTION OF THE DRAWINGS

FIG. 2A shows a tomographic refractive index profile of the 7-core MCF shown in FIGS. 1A and 1B. FIG. 2B shows an image of a hexagonally arranged VCSEL array that can be used to interface with the outer six cores of the MCF shown in FIGS. 1A and 1B.

DETAILED DESCRIPTION

The present description of the invention is organized into the following sections:
1. Multicore Multifiber Connectors Using Circular Fibers
2. Multicore Multifiber Connectors Using D-Shaped Fibers
3. Alignment Techniques for D-Shaped Multicore Fibers
 3.1 Ramp Method
 3.2 Tapered Slot Method
 3.3 Slot Method
 3.4 Wedge Method
4. Multifiber Ferrules with D-Shaped Holes and D-Shaped Fibers
5. Multicore Multifiber Connectors Using Polygonal Fibers
6. Multicore Multifiber Connectors Using Other Fiber Shapes
7. General Techniques
8. Conclusion 1. Multicore Multifiber Connectors Using Circular Fibers To address the shortcomings of the current approach, multicore fibers (MCF), which can be butt-coupled with specially designed 2-dimensional VCSEL and PiN photo detector arrays to facilitate simultaneous transmission over several cores, within each fiber, are utilized.

Figure 1A:
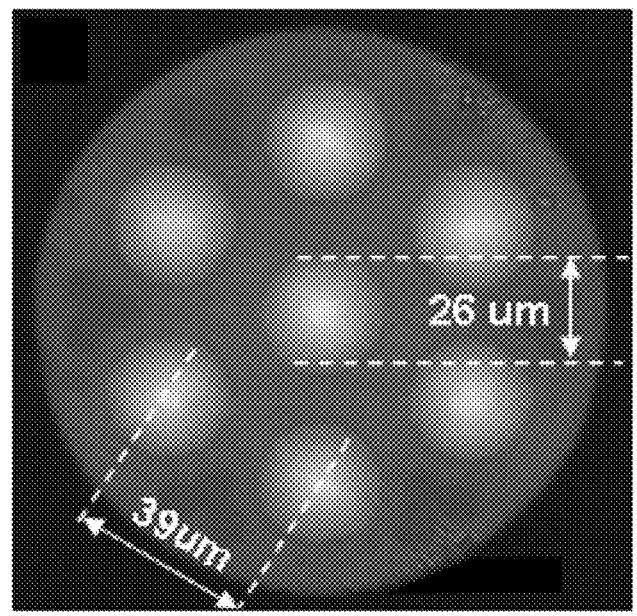
FIGS. 1A and 1B show, respectively, a cross section photograph and diagram of an exemplary MCF 10
Figure 1B:
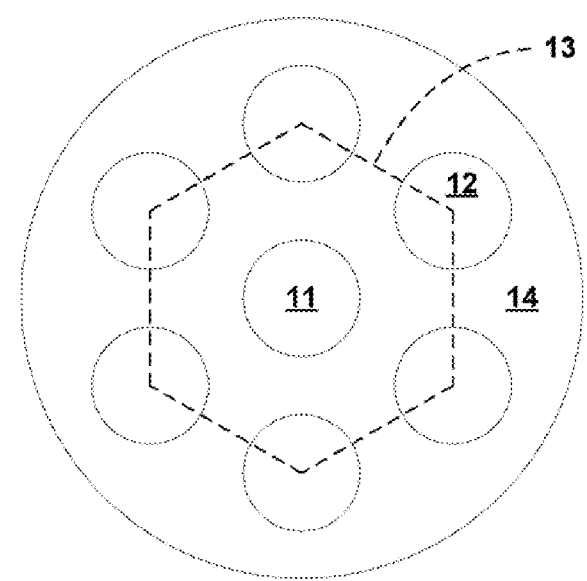

FIGS. 1A and 1B show, respectively, a cross section photograph and diagram of an exemplary MCF 10, which is described in greater detail in U.S. patent application Ser. No. 13/045,064, which is owned by the assignee of the present application, and which is incorporated herein in its entirety.

MCF 10 comprises seven graded-index cores, produced from seven graded-index LaserWave fiber core rods using a stack-and-draw process. The cores are arranged in a hexagonal array including a center core 11 and six outer cores 12 positioned at the vertices of a regular hexagon 13 in a cladding 14. The diameter of each of the cores is 26 µm, and the core pitch is 39 µm. The cladding diameter is 125 µm and the acrylate dual coating layer (not shown) is 250 µm. These diameters are compatible with conventional optical connectivity products, but other cladding diameters and geometrical configurations are also feasible. It should also be noted that aspects of the invention described herein may also be practiced with multicore fibers having different types of cores, such as step-index or single-mode cores.

Figure 2C:
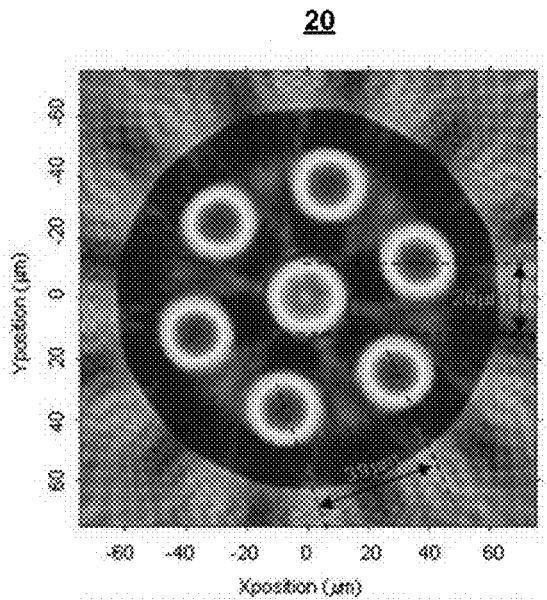
FIG. 2C shows an image of a transmitter subassembly, comprising four side-by-side VCSEL arrays of the type shown in FIG. 2B.
Figure 2C:
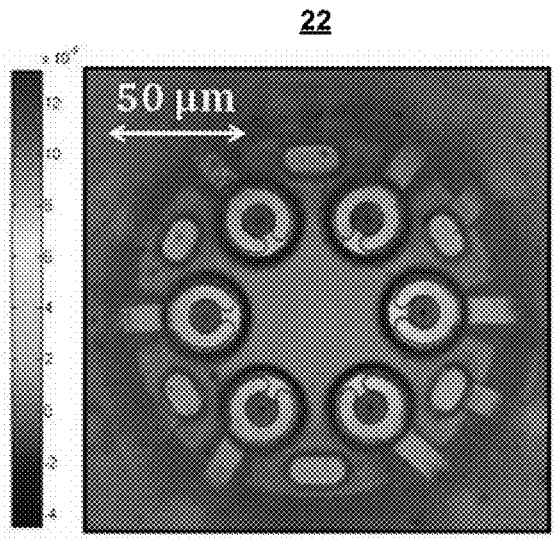
Figure 2C:
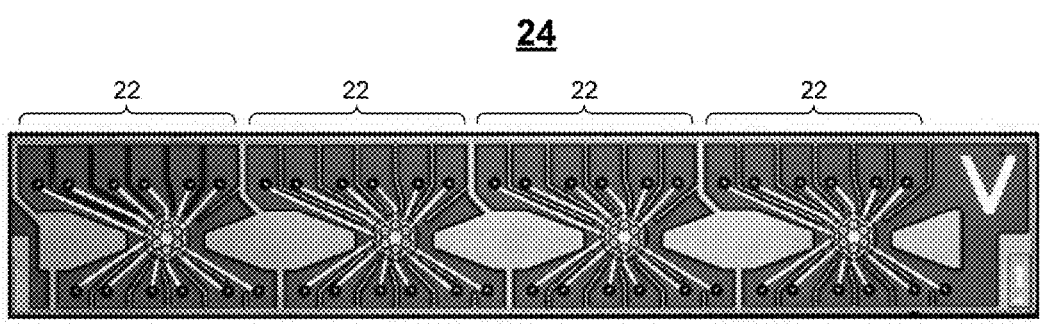

FIG. 2A shows a tomographic refractive index profile 20 of MCF 10. FIG. 2B shows an image of a hexagonally arranged VCSEL array 22 that can be use to interface with the outer six cores of MCF 10. FIG. 2C shows an example of four VCSEL arrays 22, each array comprising six VCSELs. Such a device could be used to transmit through the six outer cores of a 7-core multicore fiber. Of course, other core counts and VCSEL configurations are possible (e.g., 2×2, etc.).

Aspects of the present invention are described with respect to an exemplary multifiber ribbon cable comprising a plurality of individual MCFs arranged side-to-side in a single linear array. However, it will be appreciated that, with suitable modification as required, the described structures and techniques may also be practiced with other configurations.

As mentioned above, MCF 10 has an outer diameter that is compatible with already existing single-core fiber connectivity products. Thus, a multi-MCF cable will be compatible with ferrules and other connectors developed for single-core multifiber cables. However, as discussed below, beyond the issue of fit, there is an issue with respect to achieving a proper rotational alignment of each individual MCF within a given connectivity device.

Figure 3:
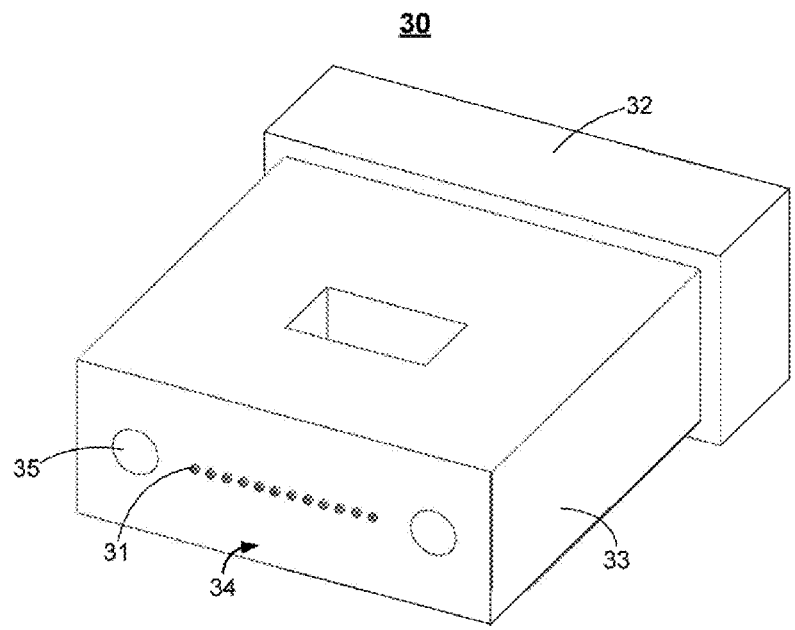
FIG. 3 shows a perspective view of an exemplary 12-fiber MT ferrule, into which there are terminated twelve 7-core MCFs.
Figure 4:
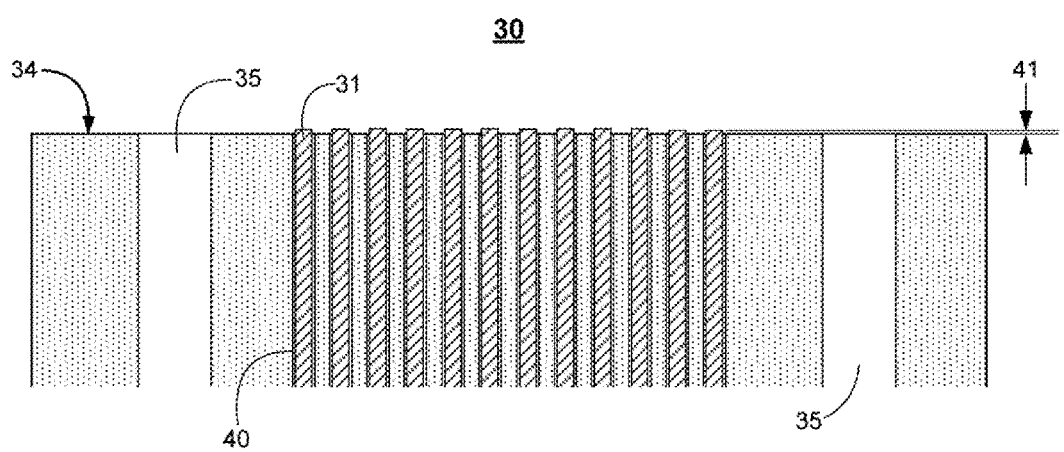
FIG. 4 shows a cross section of the front section of ferrule shown in FIG. 3, through a plane passing through the longitudinal axes of the MCFs.

FIG. 3 shows a perspective view of an exemplary 12-fiber MT ferrule 30, into which there are terminated twelve 7-core MCFs 31. FIG. 4 shows a cross section of the front section of ferrule 30, through a plane passing through the longitudinal axes of MCFs 31.

Ferrule 30 comprises a molded plastic body including two block-shaped sections: base 32 and head 33. A plurality of guide holes 40, arranged side-to-side in a linear array, extends through the ferrule head 33 terminating at ferrule endface 34. Guide holes 40 are shaped and dimensioned to closely receive fibers 31. At the end of the ferrule mounting process, each fiber is firmly held in position within its respective guide hole by epoxy, or other suitable material.

Prior to the fibers being bonded to the ferrule with epoxy, each fiber is rotated longitudinally with respect to the ferrule such that the cores of each fiber are aligned in a pre-determined orientation. For instance, each fiber could be oriented so one of its cores is in the 12 o'clock position. The orientation could be performed manually or via an automated process.

Ferrule 30 further comprises a pair of alignment holes 35. As discussed below, alignment holes 35 are configured to receiving respective alignment pins in order to help align ferrule 30 as it is seated into a mating structure.

It will be seen that by combining ferrule 30, containing appropriately aligned MCFs 31, with a suitably configured 2-dimensional VCSEL array, of the type shown in FIG. 2C (array 24), it is possible to realize parallel transmission down 72 channels in the same space required for 12-channel transmission with conventional single-core fibers.

Since MT ferrules are available with fewer holes, terminated variants with fewer fibers could also be produced. Also, multicore fibers could be utilized in other multi fiber connector configurations like MT-RJ and MPX connectors, as previously mentioned. MT-RJ connectors typically contain 2 to 4 fibers and MPX Connectors could be produced with 4, 8, or 12 multicore fibers. In addition, multicore fibers with any number of cores, and MT ferrules with any number of holes could be produced. Thus, multifiber connectors with various channel counts are possible.

For reliable connections between fibers, all of the fiber cores must be in contact, under pressure, when two multifiber connectors are mated. This is particularly important for multicore fibers, since the cores can be located some distance from the axis of the fiber. When connectors are polished, the endfaces of the fibers are convex. Thus, fiber-to-fiber contact pressure is required to deform (i.e., flatten) the convex endfaces enough to allow the outer cores to fully meet. Fiber-to-fiber contact between multifiber connectors is achieved by polishing the multifiber ferrules so the fibers protrude several micrometers, above the surface of the ferrule.

FIG. 4, discussed above, illustrates the protrusion of the MCFs 31 from the ferrule endface 34. As mentioned above, the MCFs have an outer cladding diameter of approximately 125 µm. After assembly, each MCF will typically protrude from the ferrule endface 34 a distance ranging from 1 µm to 15 µm.

2. Multicore Multifiber Connectors Using D-Shaped Fibers

Figures 5, 6:
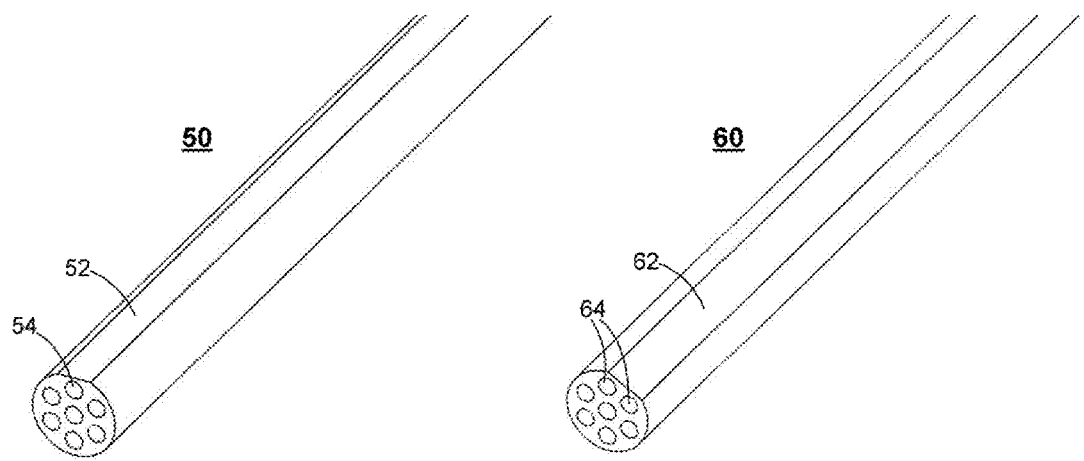
FIGS. 5 and 6 show perspective views of exemplary D-shaped 7-core multicore fibers 50, 60 according to aspects of the invention.

FIGS. 5 and 6 show perspective views of exemplary D-shaped 7-core multicore fibers 50, 60 according to aspects of the invention. Each multicore fiber 50, 60 is provided with a flat side flat surface 52, 62 extending along the length of the fiber. It should be noted that although fibers 50 and 60 are each depicted with a single flat side surface, aspects of the present invention may also be practiced with a fiber comprises a plurality of flat side surfaces.

In each multicore fiber 50, 60, the flat 52, 62 is strategically located to facilitate core orientation relative to the keying features of an optical connector. In FIG. 5, the flat is adjacent to one of the MCF cores 54, so the position of that core, as well as that of the remaining cores can be oriented and fixed relative to the keying features of a multi fiber connector. As shown in FIG. 6, the flat could be positioned adjacent to any two side-by-side cores 64, which would also allow the position of those two cores, as well as that of the remaining cores, to be oriented and fixed relative to the keying features of a connector.

3. Alignment Techniques for D-Shaped Multicore

A significant issue to be resolved in mounting a ferrule onto an end of a multi-MCF cable is rotational alignment of the individual MCFs within the ferrule. It will be appreciate that when a multi-MCF cable end is stripped, and when the individual MCFs are loaded into a ferrule, there will typically be some amount of rotational misalignment of the MCF cores. Thus, even if the individual MCFs are precisely aligned within the jacketed cable, and even if the ferrule guide holes precisely fit the bare MCFs, it will typically still be necessary to perform a precise, final rotational alignment before the individual MCFs are epoxied into their respective guide holes.

There are now described a number of structures and techniques that provide repeatable, cost-effective ways to achieve this precise, final rotational alignment of individual multicore fibers within their respective ferrule guide holes. Examples of these structures and techniques are described using D-shaped fiber 50, shown in FIG. 5, and ferrule 30, shown in FIGS. 3 and 4. However, it will be appreciated that these examples are not intended to be limiting, and that it would be possible to practice aspects of the invention, with suitable modification as required, with different types of MCFs and ferrules.

Figure 7:
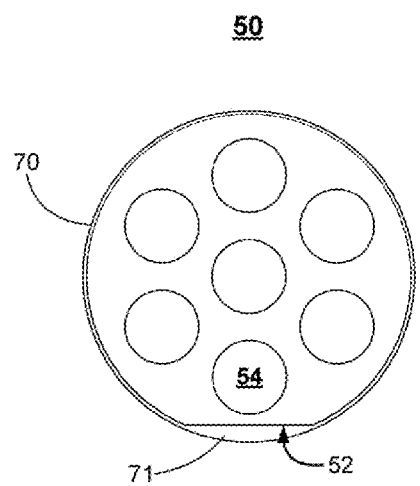
FIG. 7 shows a cross section diagram of the D-shaped MCF shown in FIG. 5.

FIG. 7 shows a cross section diagram of a D-shaped MCF 50, which has seven cores 54, and a flat side surface 52 proximate to one of the cores 54. MCF 50 is loaded into a circular ferrule guide hole 70, similar to ferrule guide holes 40 shown in FIG. 4. It will be seen that although there is a small gap 71 between the fiber's flat side surface 52 and the perimeter of guide hole 70, the guide hole 70 nonetheless provides radial confinement of fiber 50 in all directions.

According to the below-described aspects of the invention, the MCF flat side surface 52 is used to achieve a precise rotational alignment of MCF 50 within circular guide hole 70.

Figure 8:
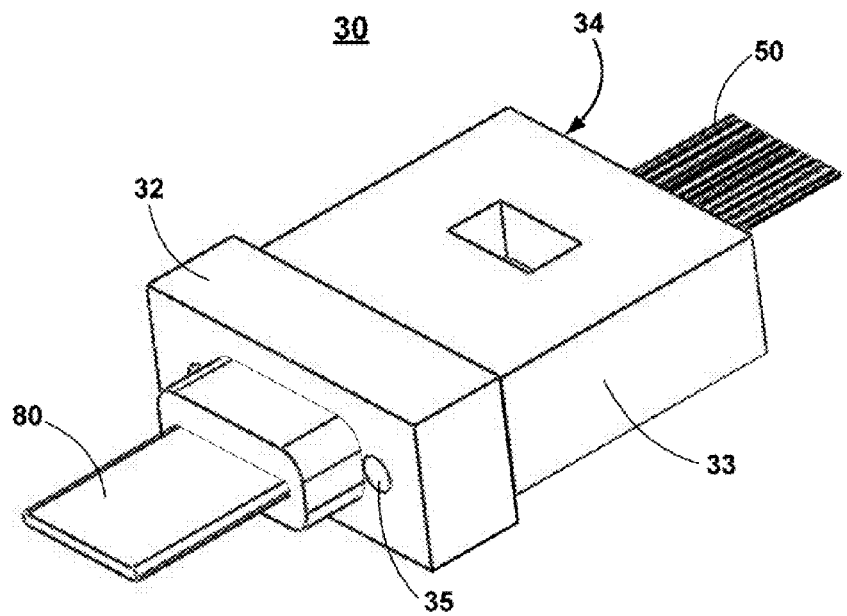
FIG. 8 shows a perspective view of the ferrule shown in FIG. 3, into which there has been loaded a multi-MCF cable containing a plurality of individual MCFs.

FIG. 8 shows a perspective view of ferrule 30, into which there has been loaded a multi-MCF cable 80 containing a plurality of individual MCFs 50. For the purposes of the present description, it is assumed that MCFs 50 are arranged within cable 80 in a side-to-side linear array, and that, within cable 80, the MCFs have a desired rotational alignment, or a substantial approximation thereof, in which the flat side surfaces 52 of all of the fibers 50 are lined up with each other across the array, and all face in the same direction. It should be noted, however, that aspects of the invention may also be practiced with other types of alignment schemes, including schemes in which the respective flat side surfaces of some or all of the individual fibers do not line up with each other.

An end of cable 80 is prepared for connectorization by stripping away the jacket and other protective layers to expose the bare fibers 50. As shown in FIG. 8, the cable is then loaded into ferrule 30, with a certain amount of excess fiber 50 extending out of the ferrule endface. The length of the excess fiber will be dictated by the requirements of the particular alignment technique used.

Figure 9:
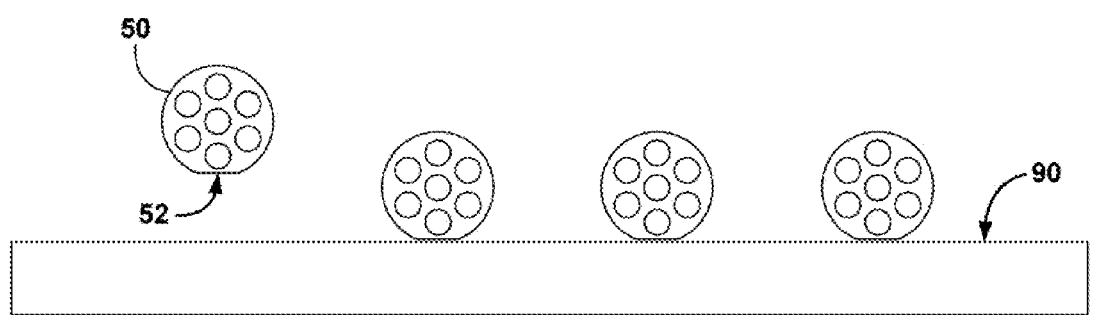
FIG. 9 is a diagram illustrating a general technique for providing alignment of fibers within their respective ferrule guide holes.

FIG. 9 is a diagram illustrating a general technique for providing the above-described final alignment of fibers 50 within their respective ferrule guide holes. According to various aspects of the invention discussed below, ferrule 30 and cable 80 are loaded into an alignment fixture having an alignment surface 90 therein. The alignment surface includes structures for causing the flat side surfaces of the individual fibers 50 to lie flat against the alignment surface 90, thereby causing the individual fibers to be rotationally aligned within their respective guide holes.

Once the final rotational alignment has been performed, epoxy or other suitable material can be injected into the guide holes to hold the fibers in place. The excess fiber can then be trimmed proximate to the ferrule endface, and the trimmed ends can then be polished to produce the desired convex shape for the fiber endfaces.

Four alignment techniques are described: (1) the "ramp" technique; (2) the "tapered slot" technique; (3) the "side-entry slot" technique; and (4) the "wedge" technique. Each technique is described in turn below.

3.1 Ramp Technique

Figure 10A:
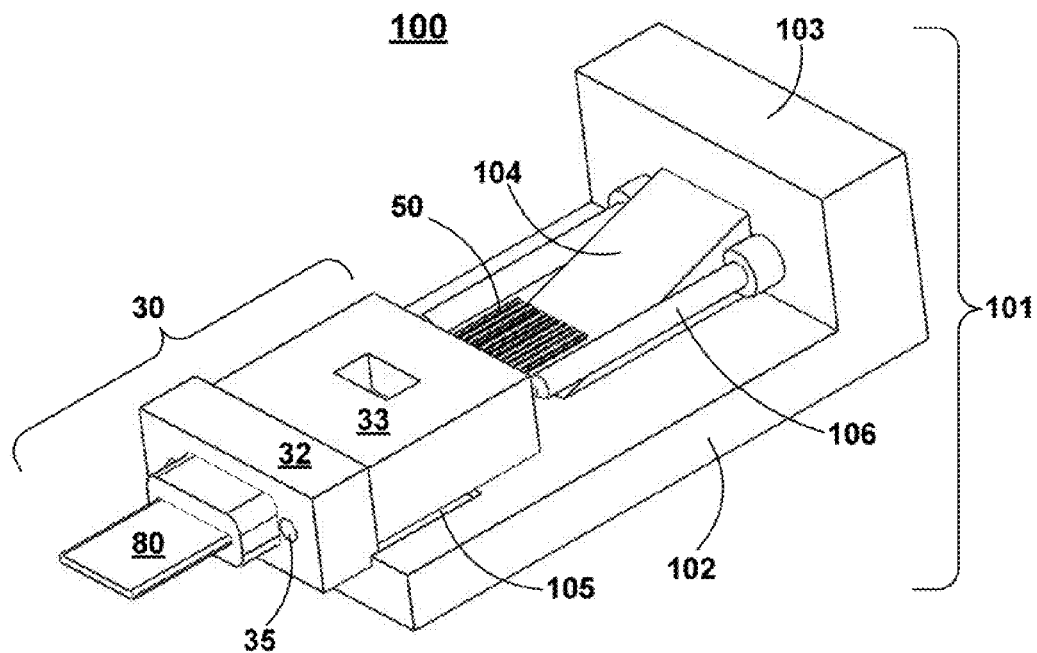
FIGS. 10A and 10B show a perspective view of an alignment fixture employing a "ramp" technique, in accordance with an aspect of the invention.
Figure 10B:
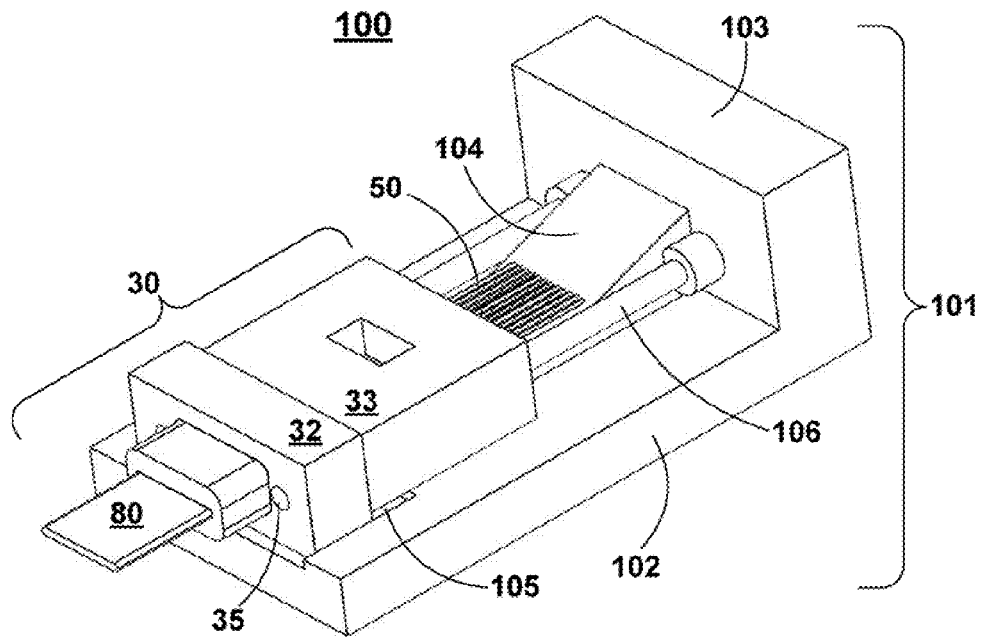

FIGS. 10A-10B shows a perspective view of an alignment fixture 100 employing a "ramp" technique, in accordance with an aspect of the invention. Alignment fixture 100 comprises an L-shaped chassis 101 having a base 102, an upright 103, and a ramp 104. The upper surface of base 102 includes a cutout 105 therein. A pair of MT alignment pins 106 extends from the upright 103, substantially parallel with the upper surface of base 102. Ramp 104 is positioned between the pair of MT alignment pins 106, and provides a smooth transition from a lower front elevation to a higher rear elevation.

Ferrule 30, with protruding fibers 50, is loaded into alignment fixture 100 by positioning the ferrule 30 such that front bottom edge of ferrule head 33 abuts the upper surface of base 102, such that the front bottom edge of ferrule base 32 abuts the front portion of cutout 105, such that the ferrule alignment holes 35 are aligned with alignment pins 106, and such that the exposed ends of bare fiber 50 abut, or are proximate to, the upper surface of ramp 104.

In FIG. 10A, ferrule 30 has been loaded into fixture 100, but fibers 50 have not yet come into contact with ramp 104.

The ferrule 30 is then advanced towards fixture upright 103. The respective shapes of the cutout 105 and the ferrule base 32, and the close fit therebetween, causes the ferrule to be guided along a substantially straight line, whereby alignment pins 106 become seated in holes 35. The movement of the ferrule causes the fiber ends to be urged against the ramp surface. The urging of the fiber ends against the ramp surface causes the fiber flats to become aligned with respect to the ramp surface.

In FIG. 10B, ferrule 30 has been advanced toward fixture upright 103 a sufficient distance to cause fibers 50 to come into contact with ramp 104.

The operation of fixture 100 is illustrated in FIGS. 11A-D. For the purposes of illustration, the amount of rotational alignment has been exaggerated. In actual use, the amount of alignment will be significantly less.

Figure 11A:
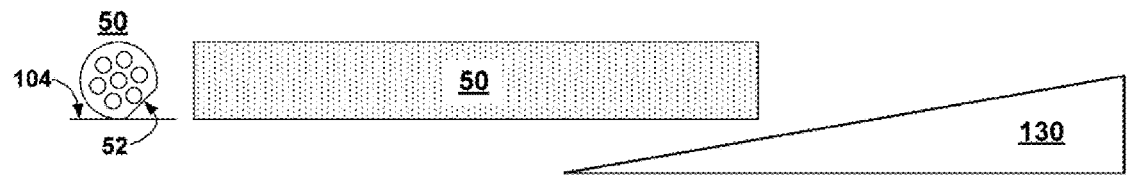
FIGS. 11A-D are a series of diagrams illustrating the operation of the alignment fixture shown in FIGS. 10A-10B.

In FIG. 11A, fiber 50 has not yet made contact with ramp 104.

Figure 11B:
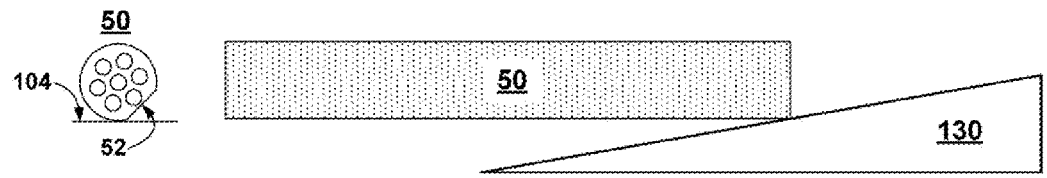

In FIG. 11B, fiber 50 has come into contact with ramp 104.

Figure 11C:
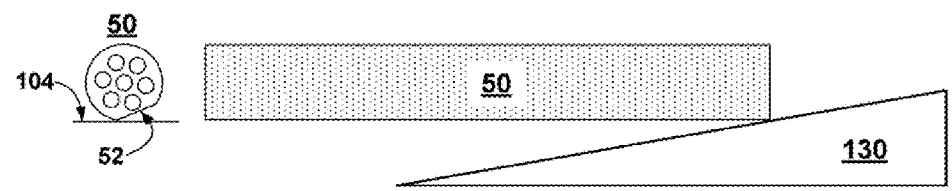

In FIG. 11C, fiber 50 has traveled far enough up ramp 104 to cause a partial rotational alignment of fiber 50.

Figure 11D:
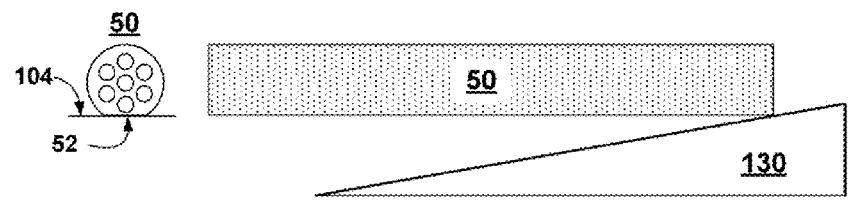

In FIG. 11D, fiber 50 has traveled far enough up ramp 104 to cause complete rotational alignment of fiber 50.

It will be appreciated that the depicted structures may be modified by the inclusion of additional, or different, alignment and retention structures and may be practiced using differently shaped fibers and ramps.

3.2 Tapered Slot Technique

Figure 12A:
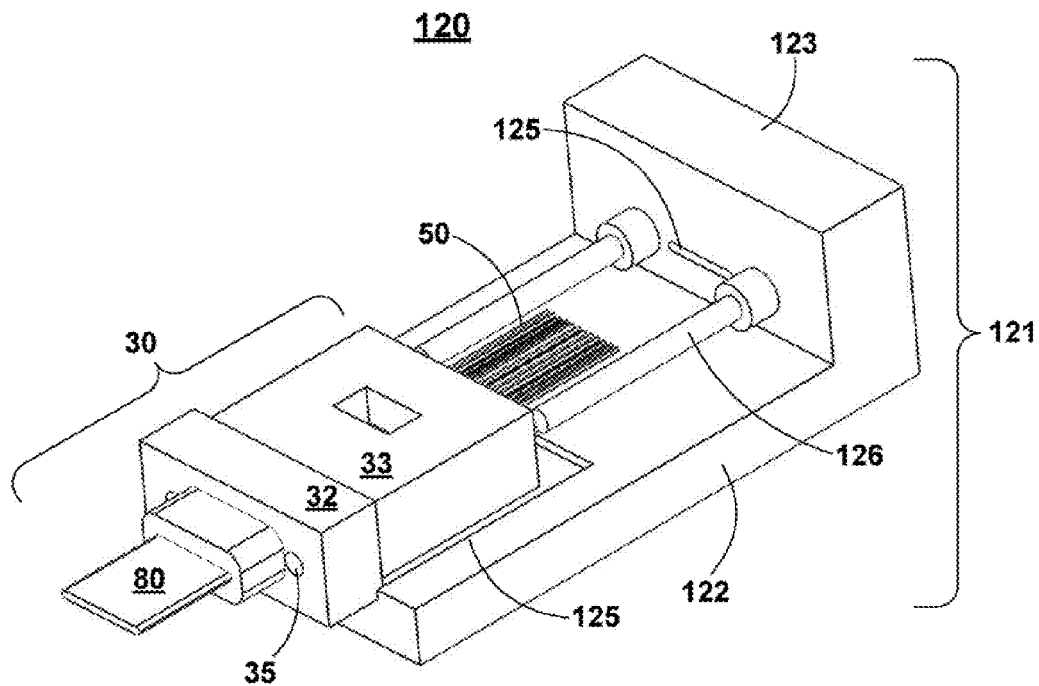
FIGS. 12A-12C show perspective views of an alignment fixture employing a "tapered slot" technique according to a further aspect of the invention.
Figure 12B:
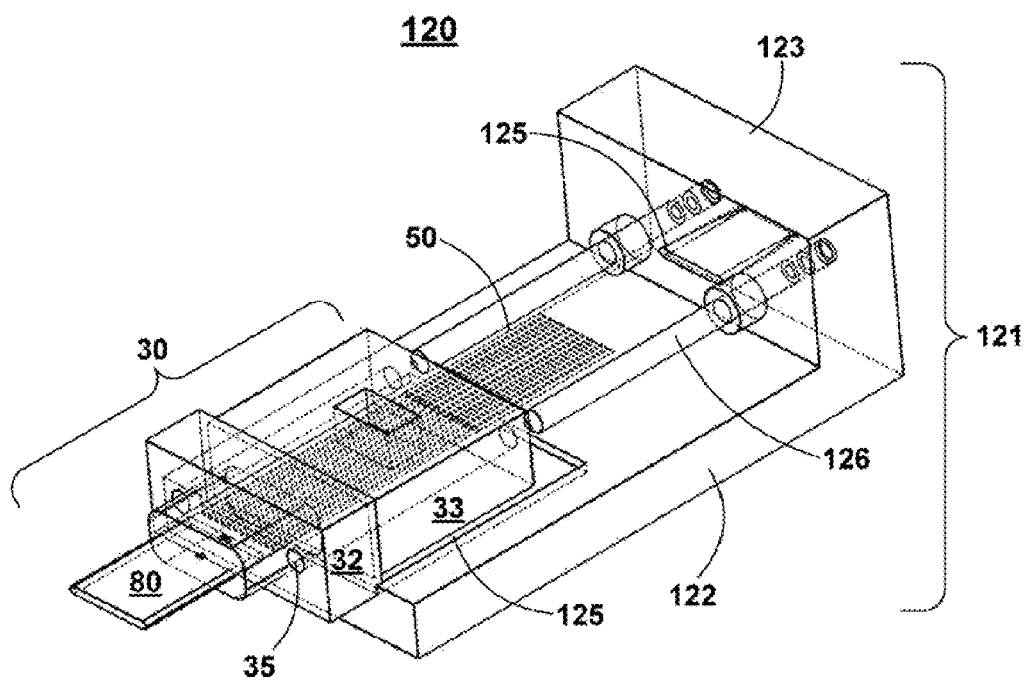
Figure 12C:
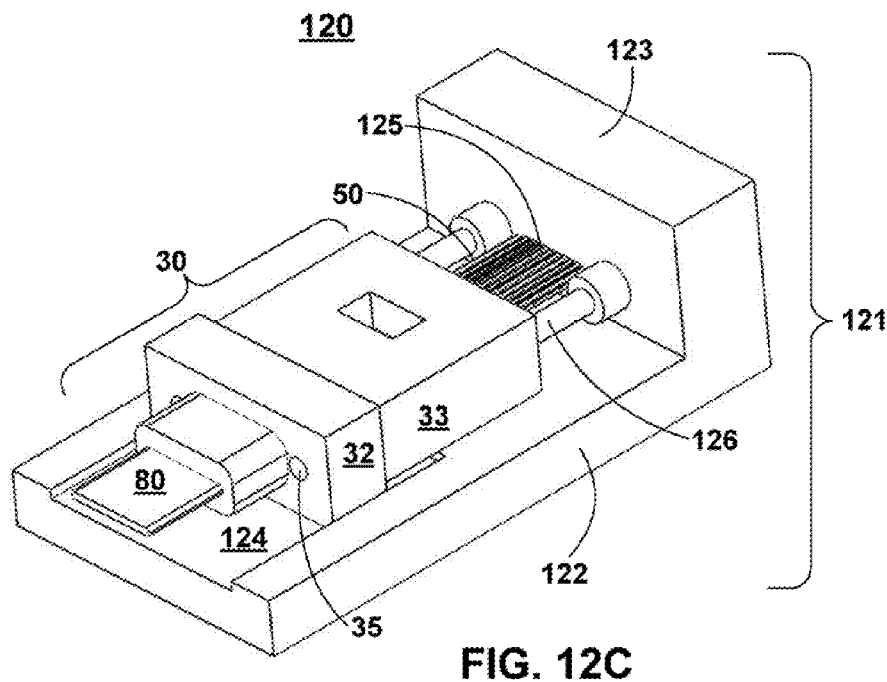

FIGS. 12A-12C show perspective views of an alignment fixture 120 employing a "tapered slot" technique according to a further aspect of the invention. (FIG. 12B shows a wireframe version of FIG. 12A.)

Alignment fixture 120 comprises an L-shaped chassis 121 having a base 122 and an upright 123. The upper surface of base 122 includes a cutout 124 therein. Upright 123 includes a tapered slot 125 generally aligned with exposed fibers 50. A pair of MT alignment pins 126 extends from the upright 123, substantially parallel with the upper surface of base 122. Tapered slot 125 is positioned between the pair of MT alignment pins 126.

Ferrule 30, with protruding fibers 50, is loaded into alignment fixture 120 by positioning the ferrule 30 such that front bottom edge of ferrule head 33 abuts the upper surface of base 122, such that the front bottom edge of ferrule base 32 abuts the front portion of cutout 124, such that the ferrule alignment holes 35 are aligned with alignment pins 126, and such that the exposed ends of bare fiber 50 are generally aligned with tapered slot 125.

In FIGS. 12A and 12B, ferrule 30 has been loaded into fixture 120, but fibers 50 have not yet been seated in tapered slot 125.

The ferrule 30 is then advanced towards fixture upright 123. The respective shapes of the cutout 124 and the ferrule base 32, and the close fit therebetween, causes the ferrule to be guided along a substantially straight line, whereby alignment pins 126 become seated in holes 35. The movement of the ferrule causes the fiber ends to be urged into tapered slot 125.

In FIG. 12C, ferrule 30 has been advanced toward fixture upright 123 a sufficient distance to cause fibers 50 to be fully seated in tapered slot 125.

The front side of the slot has a height that is larger than the diameter of the D-shaped fiber (i.e., greater than 125 µm). The back side of the tapered slot has a height smaller than the fiber O.D. (i.e., less than 125 µm), but barely large enough to allow the D-Shaped fiber to pass through, when the flat is parallel to the slot. Therefore, when the D-shaped fibers are pushed into the slot, the slot will cause the flats of the D-shaped fibers to align horizontally.

Figure 13A:
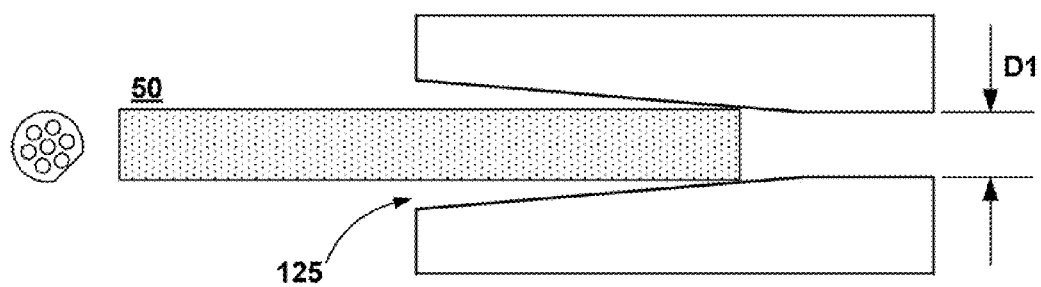
FIGS. 13A and 13B are a pair of diagrams illustrating the operation of the tapered slot technique.
Figure 13B:
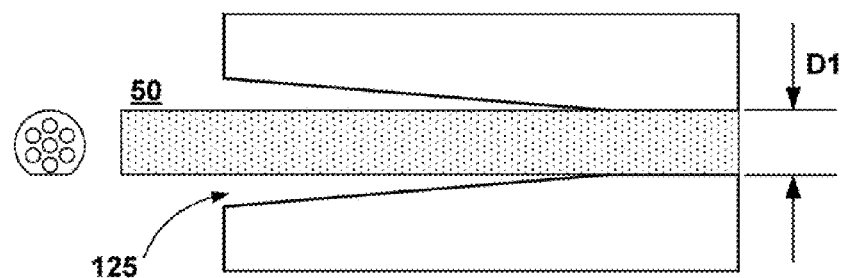

FIGS. 13A and 13B are a pair of diagrams illustrating the operation of the tapered slot technique.

In FIG. 13A, non-aligned fiber 50 only fits part way into tapered slot 125. Urging of fiber 50 deeper into slot 105 causes the fiber 50 to rotate in order to allow it to fit into the narrowed blot.

In FIG. 13B, the fiber 50 has been fully seated into slot 125.

It will be appreciated that the depicted structures may be modified by the inclusion of additional, or different, alignment and retention structures and may be practiced using differently shaped fibers and slots.

3.3 Side-Entry Slot Technique

Figure 14A:
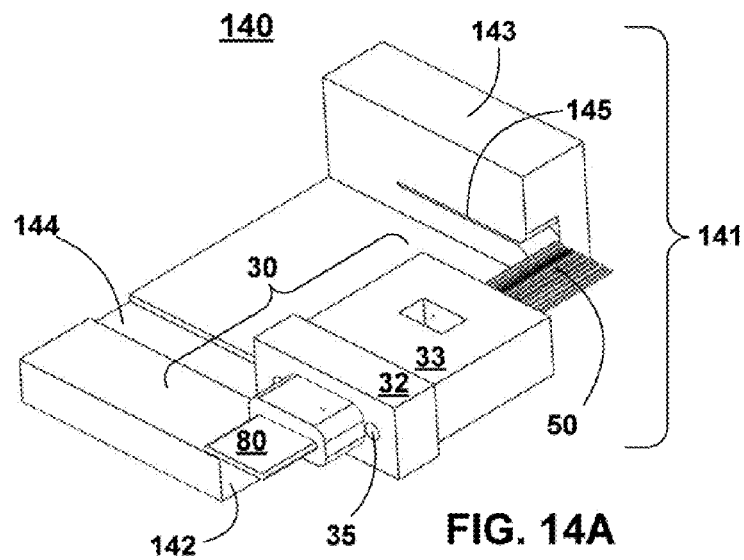
FIGS. 14A and 14B show perspective views of an alignment fixture employing a "side-entry slot" technique, according to a further aspect of the invention.
Figure 14B:
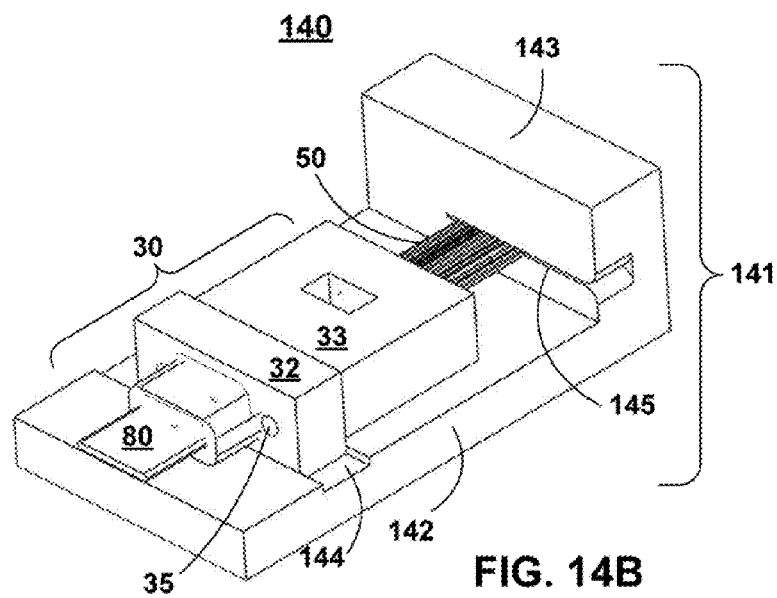

FIGS. 14A and 14B are perspective views of an alignment fixture 140 employing a "side-entry slot" technique, according to a further aspect of the invention. Fixture 140 comprises an L-shaped chassis 141 having a base 142 and an upright 143. The upper surface of base 142 includes a cutout 144 therein. Upright 143 includes a side-entry slot 145 that is substantially parallel to the upper surface of base 142, at a height aligned with the exposed fibers 50 protruding from the endface of ferrule 30.

The ferrule 30, with roughly aligned protruding fibers 50, is loaded into fixture 140 by positioning the ferrule 30 such that the left bottom edge of the ferrule head 33 abuts the upper surface of fixture base 142, such that the left bottom edge of ferrule base 31 is seated in cutout 144, and such that the exposed fibers 50 are in alignment with side-entry entry slot 145.

Ferrule 30 is advanced in a right-to-left direction. The roughly aligned multicore fibers 50, protruding out of the ferrule endface, are pushed laterally into slot 145. The slot has a height smaller than the fiber outer diameter (i.e., less than 125 µm), but barely large enough to allow the D-Shaped fibers to enter, when the fiber's flat side surface is parallel with the upper and lower surfaces of slot 145. Therefore, when the D-shaped fibers are pushed into the slot, the slot will cause the flats of the D-shaped fibers to align horizontally.

In FIG. 14A, ferrule 30 has been loaded into fixture 140, but protruding fibers 50 have not yet entered slot 145.

In FIG. 14B, ferrule 30 has been advanced far enough into fixture 140 that all of the protruding fibers 50 have been pushed into the narrowest section of the side-entry slot, resulting in the rotational alignment of the fibers within their respective ferrule guide holes.

Figure 15:
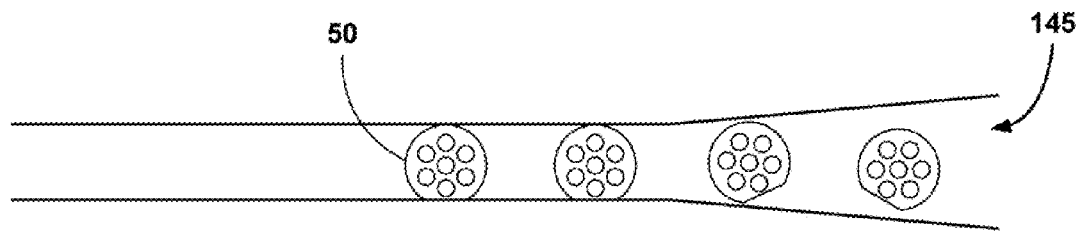
FIG. 15 shows a diagram illustrating the operation of the side-entry slot technique.

FIG. 15 shows a diagram, illustrating the operation of the side-entry slot. As shown in FIG. 15, the lateral movement of fibers 50 into the narrowest section of the slot causes the fibers to be rotated into the orientation required to fit between the upper and lower slot surfaces.

It will be appreciated that the depicted structures may be modified by the inclusion of additional, or different, alignment and retention structures and may be practiced using differently shaped fibers and slots.

3.4 Wedge Technique

Figure 16A:
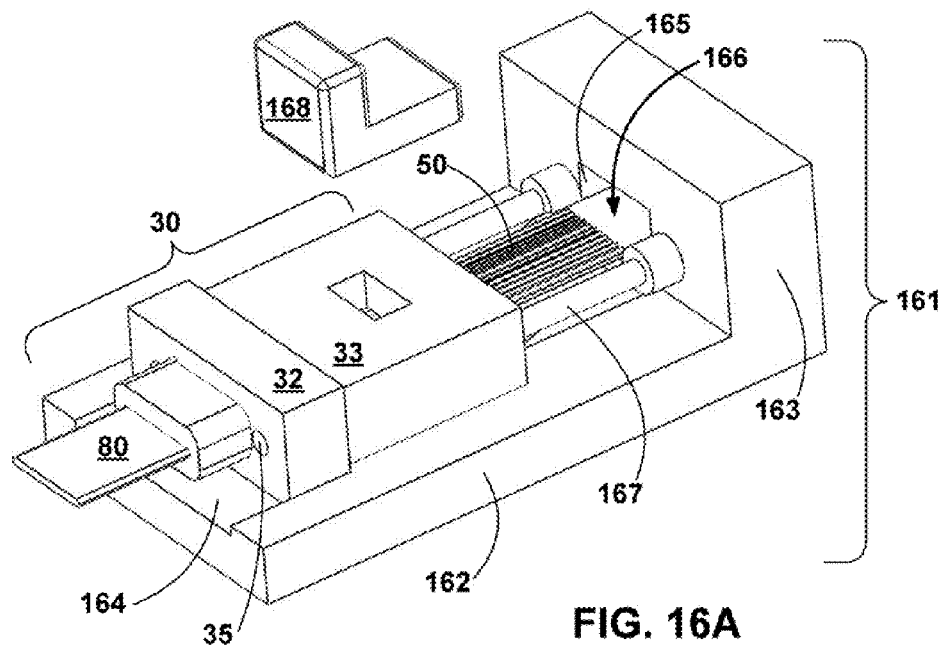
FIGS. 16A and 16B show perspective views an alignment fixture employing a "wedge" technique, according to a further aspect of the invention.
Figure 16B:
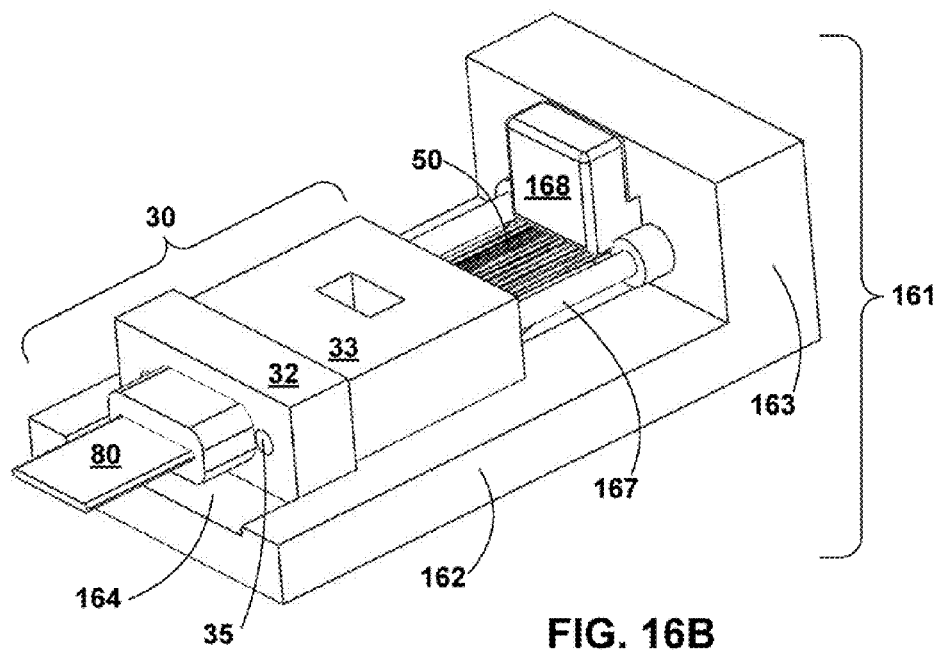

FIGS. 16A and 16B show perspective views of an alignment fixture 160 employing a "wedge" technique, according to a further aspect of the invention. Fixture 160 comprises an L-shaped chassis 161 having a base 162 and an upright 163. The upper surface of base 162 includes a cutout 164 therein. Upright 163 includes a cavity 165 with an inner surface comprising a pedestal 166 that is substantially parallel to the upper surface of base 162, and substantially in alignment with protruding fibers 50. Upright 163 further includes first and second alignment pins 167 at the left and right sides of pedestal 166.

As shown in FIG. 16A, the ferrule 30, with roughly aligned protruding fibers 50, is loaded into fixture 160 by positioning the ferrule 30 such the bottom face of the ferrule base 32 is seated in cutout 164, such that the alignment pins 167 are seated in ferrule holes 35, and such that the front end of the protruding fibers 50 are positioned on top of pedestal 166.

As shown in FIG. 16B, a wedge 168 is inserted into the mouth of cavity 165. The wedge 168 is shaped to fit closely into cavity 165. Thus, pushing wedge 168 into position within cavity 165 places a downward load on the fibers, which causes the flats to align horizontally.

Figure 17A:
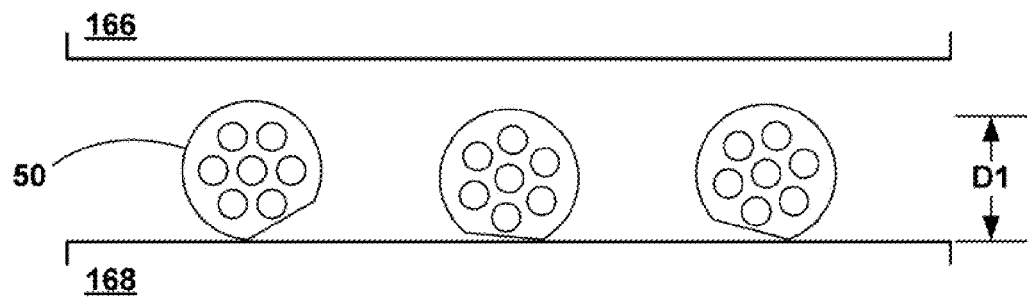
FIGS. 17A-17C are a series of diagrams illustrating the operation of the alignment fixture shown in FIGS. 16A and 16B.
Figure 17B:
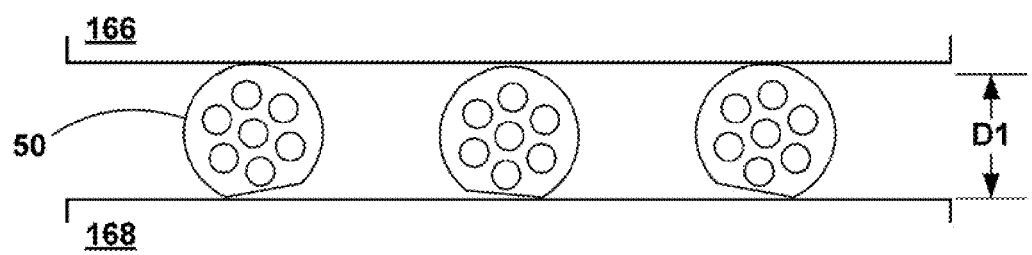
Figure 17C:
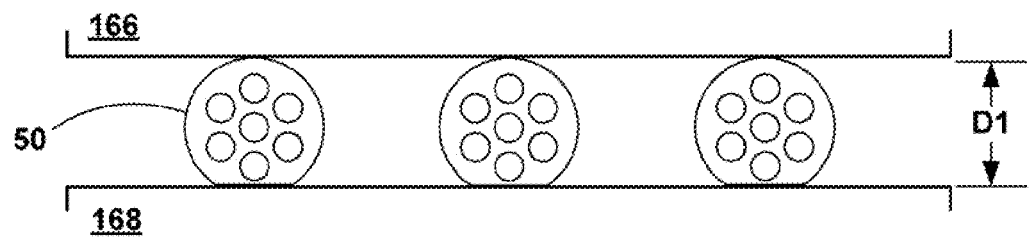

FIGS. 17A-17C are a series of diagrams illustrating the operation of alignment fixture 160.

In FIG. 17A, the wedge has been inserted, but has not yet started to press down on fibers 50.

In FIG. 17B, the wedge has been partially inserted, causing a partial rotational alignment of the fibers 50.

In FIG. 17C, the wedge has been inserted to a depth sufficient to cause complete rotational alignment of the fibers 50.

Here again, other structures incorporating different ferrule retention features are also feasible. Also, spring or clip mechanisms could be used as alternate methods to apply the downward force to the fibers.

4. Multifiber Ferrules with D-Shaped Holes and D-Shaped Fibers

According to a further aspect of the invention, the issue of providing precise rotational alignment of multicore fibers is addressed by producing special multifiber MT ferrules with D-shaped holes, pre-aligned in the desired orientation. These ferrules could be fabricated, for example, using a suitable injection-molding or transfer-molding technique. These special MT ferrules can be fabricated from glass-filled PPS, thermoset epoxy, or any other suitable thermoset or thermoplastic polymer.

Figure 18:
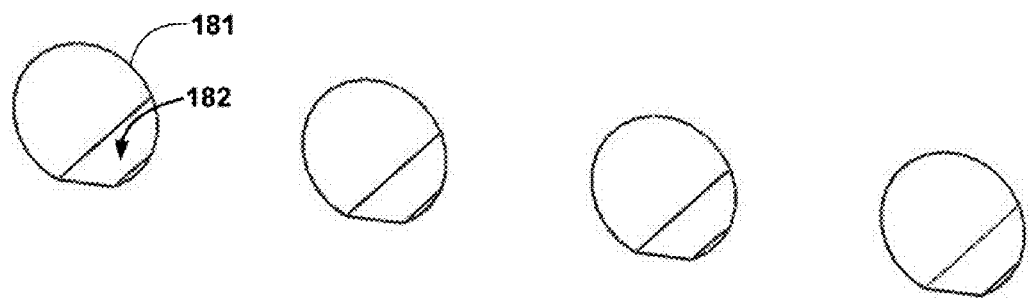
FIG. 18 shows a close-up view of an endface of an MT ferrule endface with pre-aligned D-shaped holes.

FIG. 18 shows a close-up view an endface of an MT ferrule endface with pre-aligned D-shaped holes 181. In this approach, a D-shaped fiber is automatically aligned, upon insertion into the D-shaped holes 181 of the MT ferrule 180, since the fiber flat side surface has to be in line with the hole's corresponding flat side surface 182 in order to facilitate fiber insertion.

Figure 19:
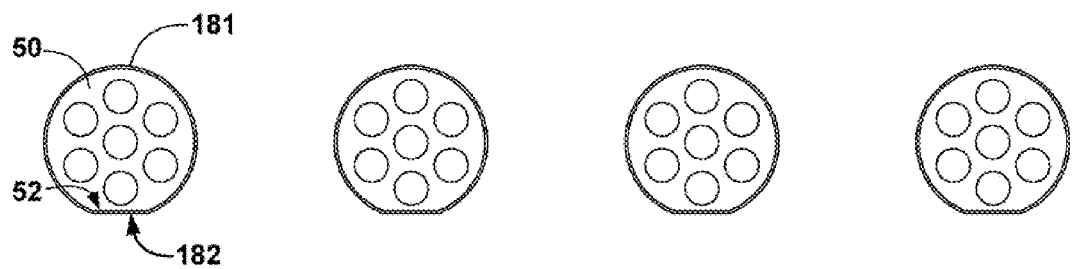
FIG. 19 shows a close-up front view of the endface of the ferrule shown in FIG. 18, with inserted fibers.

FIG. 19 is a close-up front view of the ferrule endface with inserted D-shaped fibers 50.

The depicted ferrule 180 can be modified for use with various other fiber orientations. For example, flat side surfaces on different fibers, in the same ferrule, could be facing different directions. Also, fibers and ferrule holes with two opposing flat surfaces (such as a "double D" configuration) could be used.

5. Multicore Multifiber Connectors Using Polygonal Fibers

While D-shaped fibers will facilitate fiber alignment, alternate fiber geometries that would provide, to varying degrees, similar functionality are feasible. For instance, fibers with polygonal cross sections could also be employed. The flat surfaces of the polygonal fibers would help facilitate core alignment. For instance, square, rectangular, triangular, pentagonal, hexagonal, octagonal, etc., fibers could be used.

Figure 20:
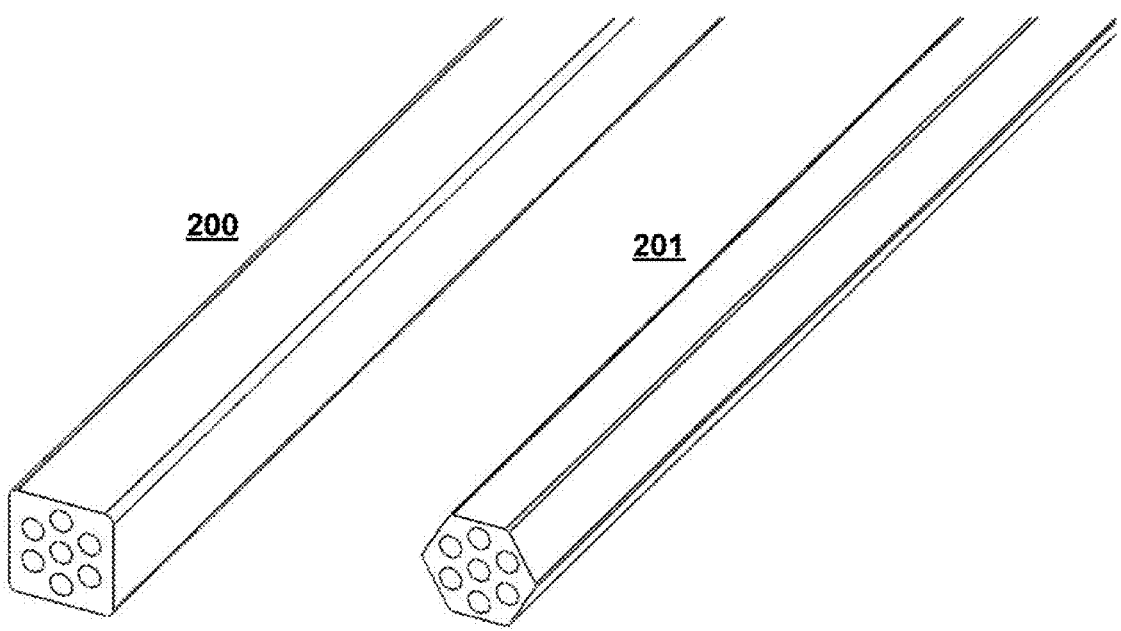
FIG. 20 shows perspective views of multicore fibers having polygonal shapes, according to a further aspect of the invention.

FIG. 20 shows perspective views of a square fiber 200 and a hexagonal fiber 201. Also, special multifiber MT ferrules with polygonal holes could be molded to accommodate and align specific polygonal fibers.

6. Multicore Multifiber Connectors Using Other Fiber Shapes

In addition to the fiber geometries already mention (i.e. circular (elliptical), D-shaped, and polygonal), other fiber geometries that would provide, to varying degrees, similar functionality are feasible. For instance, fibers with irregular cross sections (i.e. a combination of curved and flat surfaces) could also be employed. The symmetry or flat surfaces of the fibers would help facilitate core alignment. Here again, special multifiber MT ferrules with irregular holes could be molded to accommodate and align specific fiber geometries.

7. General Techniques

Figure 21:
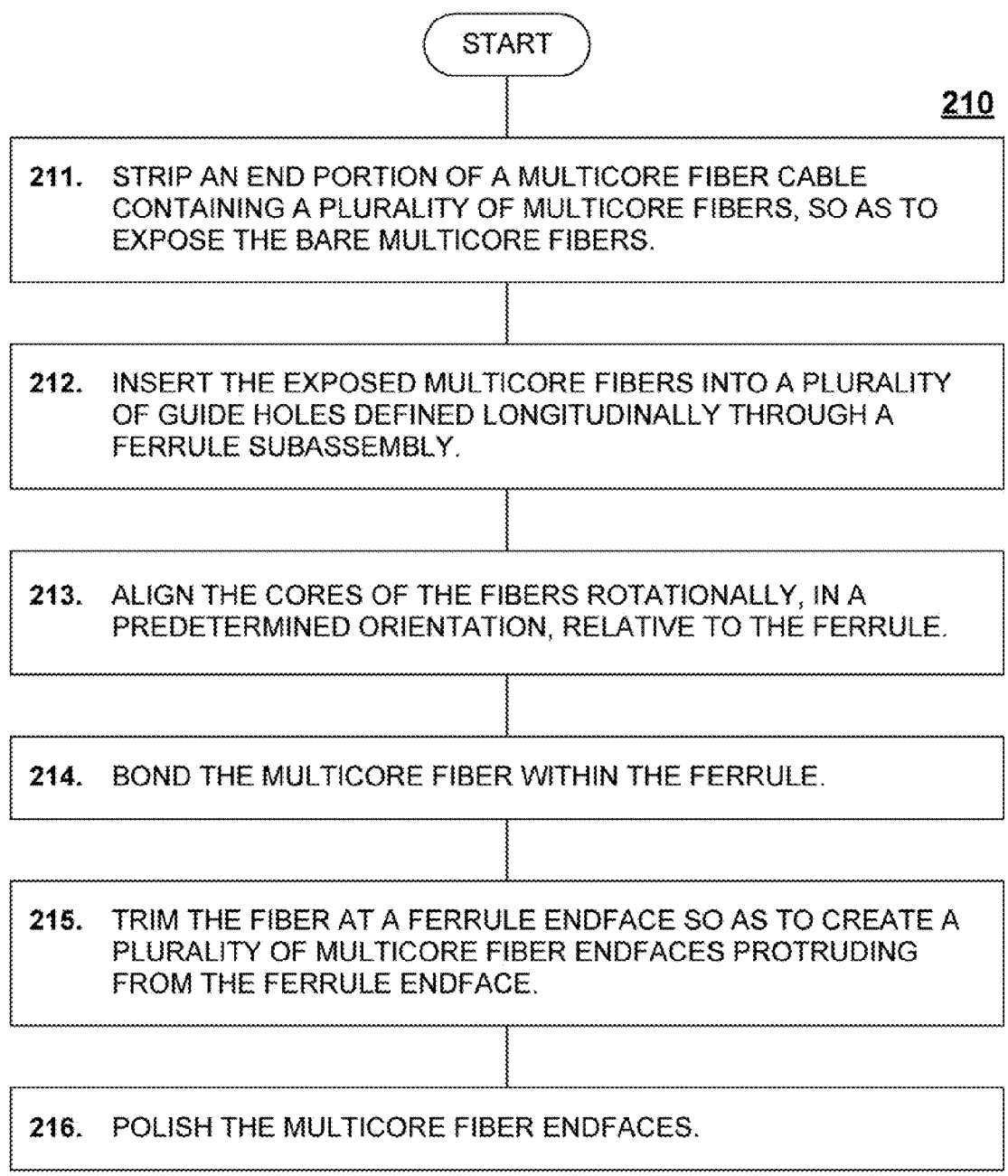
FIGS. 21 and 22 show flowcharts of general techniques according to aspects of the invention.
Figure 22:
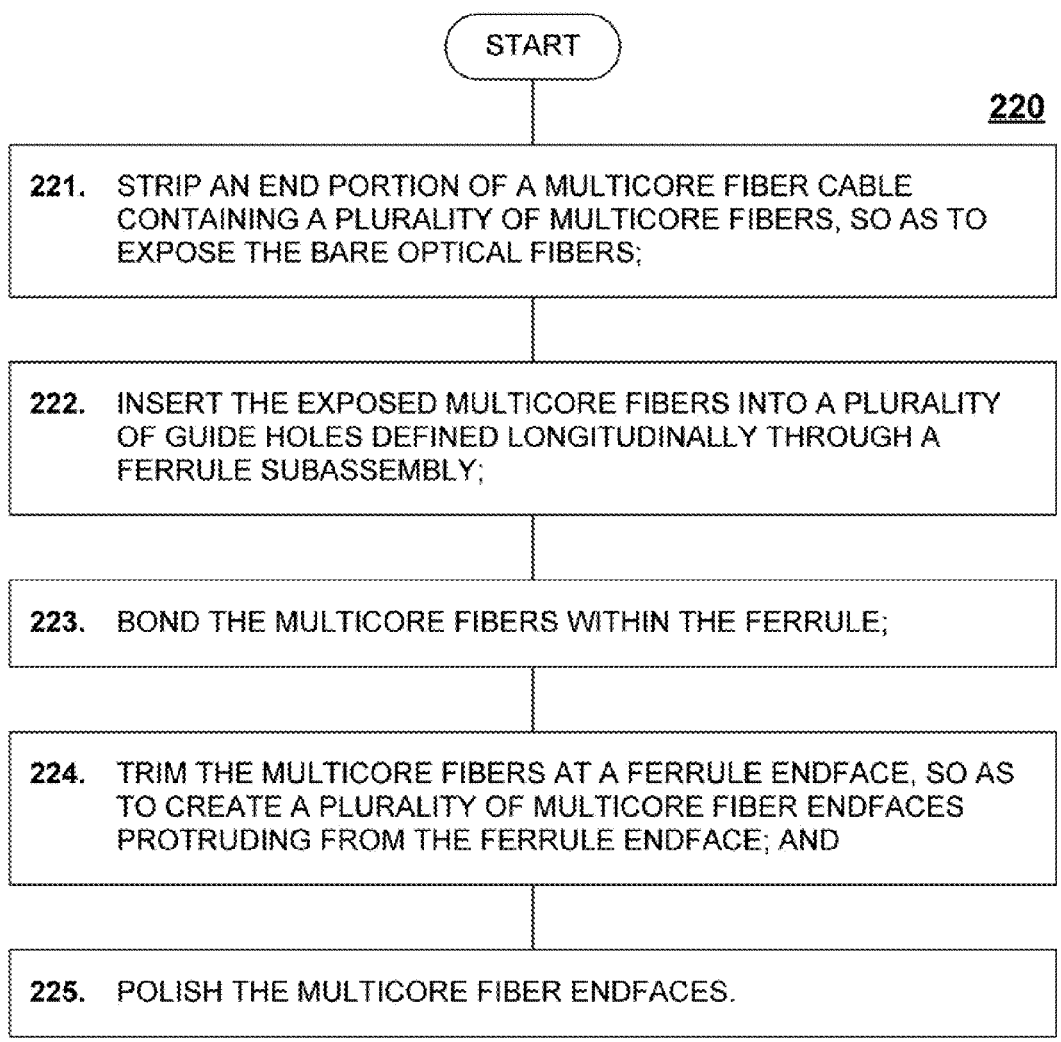

FIGS. 21 and 22 show flowcharts of general techniques 210, 220, according to aspects of the invention. It should be noted that FIGS. 21 and 22 are intended to be exemplary, rather than limiting. The present invention may be practiced in a number of different ways, using different combinations of some or all of the elements set forth in these drawings, as well as combinations including elements not explicitly set forth in these drawings.

FIG. 21 shows a flowchart of a general technique 210, according to aspects of the invention, for aligning multicore fibers within a multifiber ferrule.

General technique 210 comprises the following steps:

211: Strip an end portion of a multicore fiber cable containing a plurality of multicore fibers, so as to expose the bare multicore fibers.

212: Insert the exposed multicore fibers into a plurality of guide holes defined longitudinally through a ferrule subassembly.

213: Align the cores of the fibers rotationally, in a predetermined orientation, relative to the ferrule.

214: Bond the multicore fiber within the ferrule.

215: Trim the fiber at a ferrule endface so as to create a plurality of multicore fiber endfaces protruding from the ferrule end face.

216: Polish the multicore fiber endfaces.

FIG. 21 shows a flowchart of a further general technique 210, according to aspects of the invention, for aligning multicore fibers within a multifiber ferrule.

221: Strip an end portion of a multicore fiber cable containing a plurality of multicore fibers, so as to expose the bare optical fibers.

222: Insert the exposed multicore fibers into a plurality of guide holes defined longitudinally through a ferrule subassembly.

223: Bond the multicore fibers within the ferrule.

224: Trim the multicore fibers at a ferrule endface, so as to create a plurality of multicore fiber endfaces protruding from the ferrule endface.

225: Polish the multicore fiber endfaces.

8. Conclusion

While the foregoing description includes details which will enable those skilled in the art to practice the invention, it should be recognized that the description is illustrative in nature and that many modifications and variations thereof will be apparent to those skilled in the art having the benefit of these teachings. It is accordingly intended that the invention herein be defined solely by the claims appended hereto and that the claims be interpreted as broadly as permitted by the prior art.

The invention claimed is:

1. A multicore fiber and ferrule assembly, comprising:
   a plurality of multicore fibers at the end of a multifiber cable, each optical fiber comprising a plurality of cores extending longitudinally within a respective fiber body,
       wherein each fiber body has a circular profile with a flat side surface, and
       wherein, within each fiber body, the plurality of cores has a cross sectional geometrical configuration relative to the flat side surface, such that the at least one flat side surface identifies a particular rotational orientation of the plurality of cores, and such that precise alignment of the at least one flat side surface results in a precise rotational alignment of the plurality of cores, and
   a multifiber ferrule for terminating the plurality of multicore fibers, comprising a ferrule body having a plurality of guide holes therein for guiding the plurality of multicore fibers,
       wherein each guide hole is provided with one or more flat side surfaces therewithin corresponding to the one or more flat side surfaces of a respective multicore fiber, and
       wherein insertion of each fiber into its respective guide hole with the fiber flat side surface in line with the guide hole's corresponding flat side surface automatically aligns the fiber.

2. The multicore fiber and ferrule assembly of claim 1, wherein the multicore fibers and guide holes have D-shaped profiles.

3. The multicore fiber and ferrule assembly of claim 1, wherein the multicore fibers and guide holes have double D-shaped profiles.

4. The multicore fiber and ferrule assembly of claim 1, wherein the ferrule includes an endface, and
wherein the multicore fibers protrude from the ferrule endface a distance between 1 µm and 15 µm, after assembly and polishing.

* * * * *